United States Patent [19]

Richard

[11] 4,452,406
[45] Jun. 5, 1984

[54] LEADER BLOCK FOR SINGLE REEL TAPE CARTRIDGE

[75] Inventor: Maurice E. Richard, Tucson, Ariz.

[73] Assignee: International Business Machines Corporation, Armonk, N.Y.

[21] Appl. No.: 362,439

[22] Filed: Mar. 26, 1982

[51] Int. Cl.³ .......................... G03B 1/04; G03B 1/56; G11B 15/32

[52] U.S. Cl. ...................................... 242/195; 226/92; 242/197; 360/95

[58] Field of Search ...................... 242/192, 195, 197; 226/91, 92; 352/235; 360/93, 95, 132

[56] References Cited

U.S. PATENT DOCUMENTS

| | | | |
|---|---|---|---|
| 3,092,346 | 6/1963 | Goodell et al. | 242/197 |
| 3,136,464 | 6/1964 | Schmid | 226/91 |
| 3,169,721 | 2/1965 | Laa et al. | 242/195 |
| 3,195,825 | 7/1965 | Louzil | 242/195 |
| 3,245,629 | 4/1966 | Rost | 242/194 |
| 4,334,656 | 6/1982 | Crawford et al. | 242/195 |
| 4,335,858 | 6/1982 | Cranna | 242/195 |
| 4,383,660 | 5/1983 | Richard et al. | 242/197 |

FOREIGN PATENT DOCUMENTS 1357821 3/1964 France ............................ 242/195

*Primary Examiner*—Leonard D. Christian
*Attorney, Agent, or Firm*—J. A. Pershon; H. F. Somermeyer

[57] ABSTRACT

A single reel magnetic tape cartridge includes a leader block for interfacing with an automatic threading system in a tape drive. The leader block has a slot in its leading surface that precedes an enlarged receiving cavity. The cavity and slot interface with a coupling device in a positive connection to unwind the tape from the reel into the tape drive.

37 Claims, 12 Drawing Figures

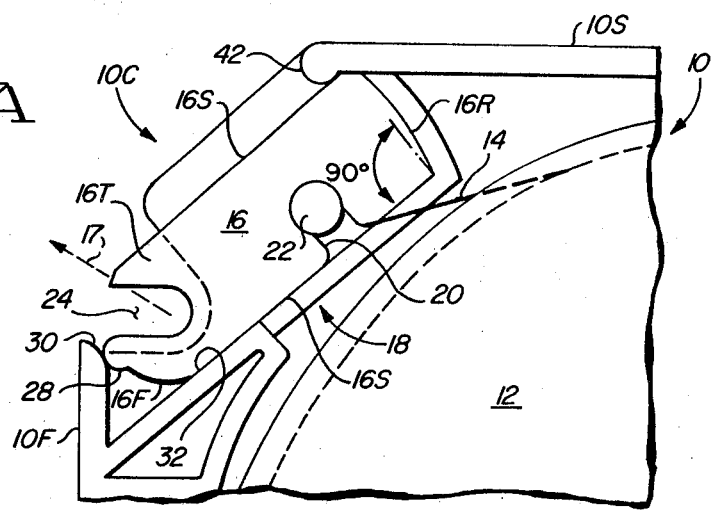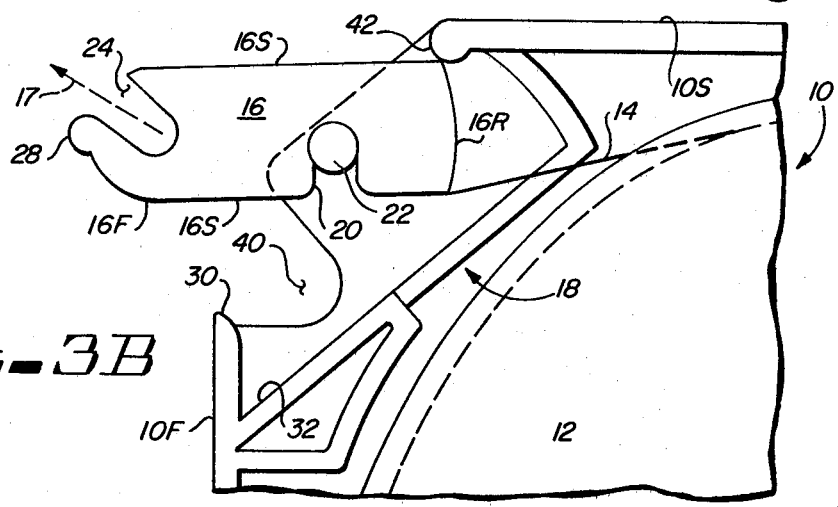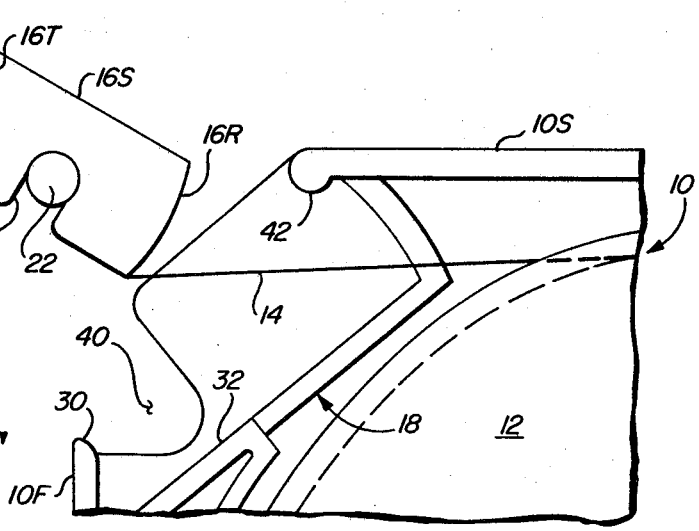

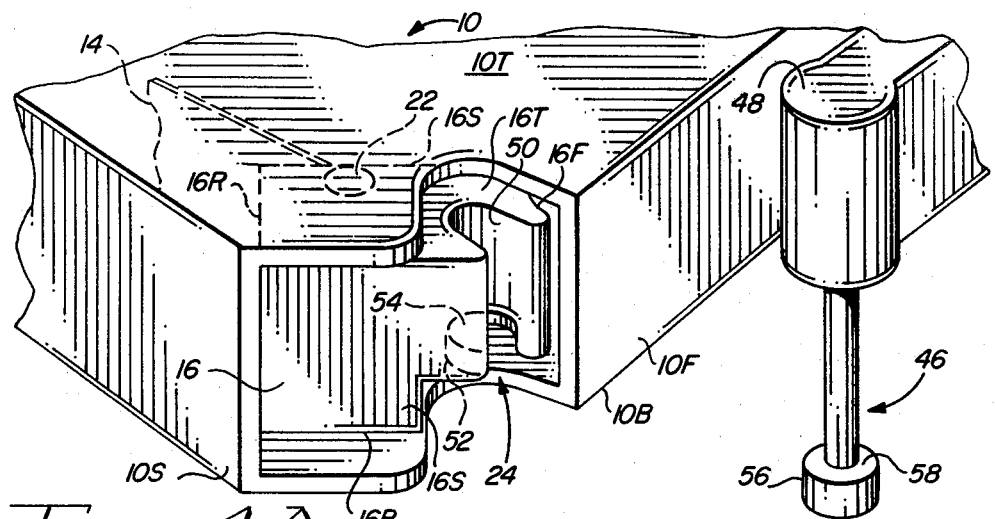
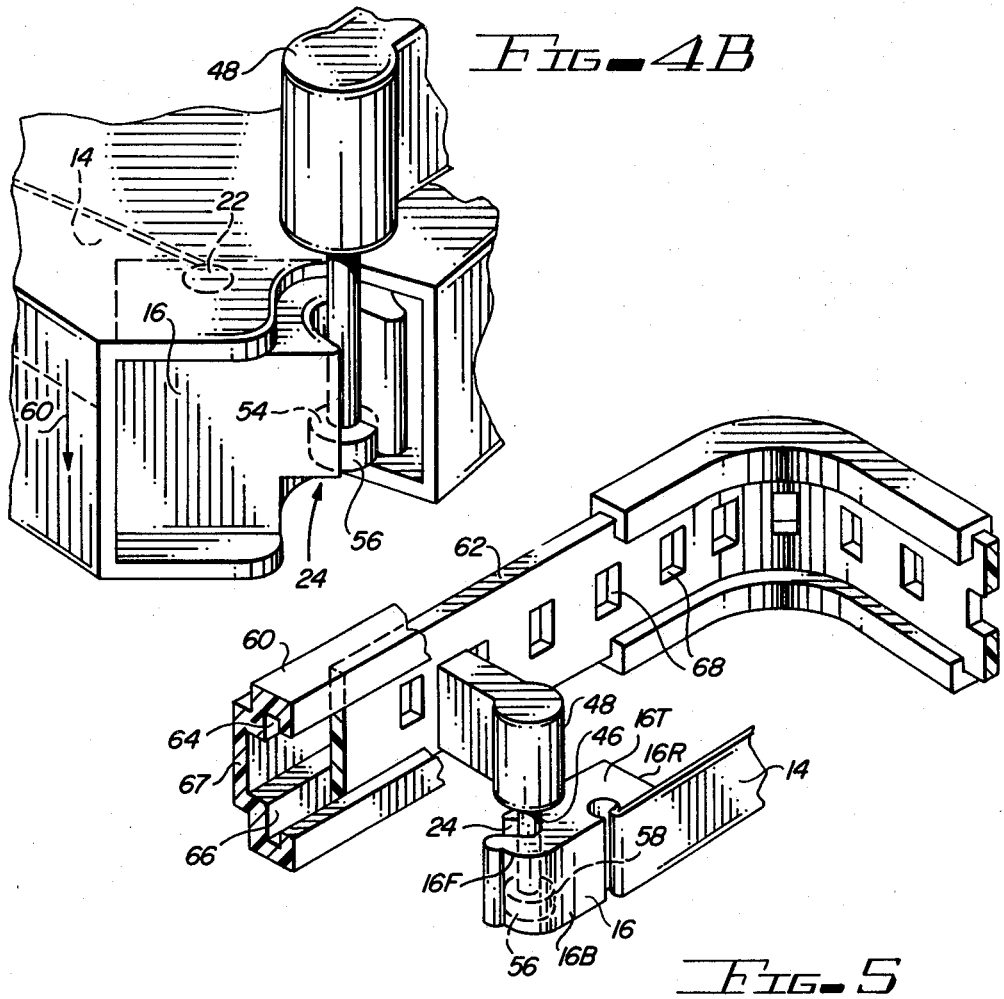

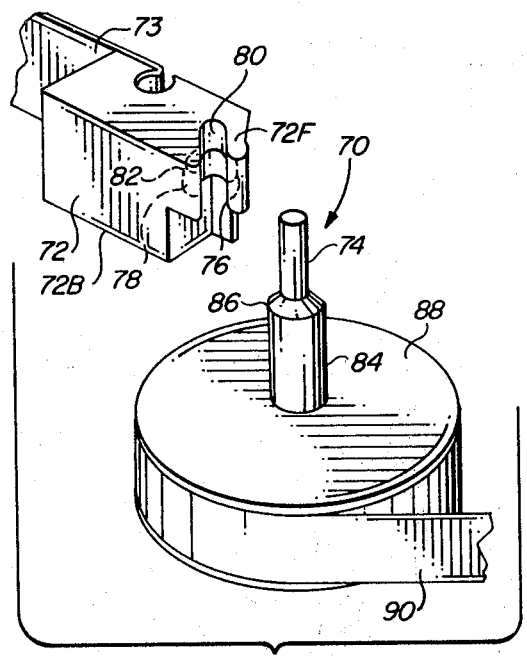
Fig-6
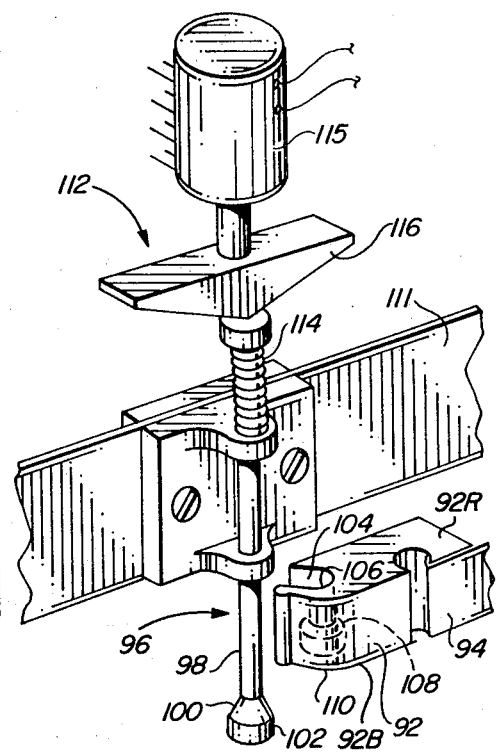
Fig-7
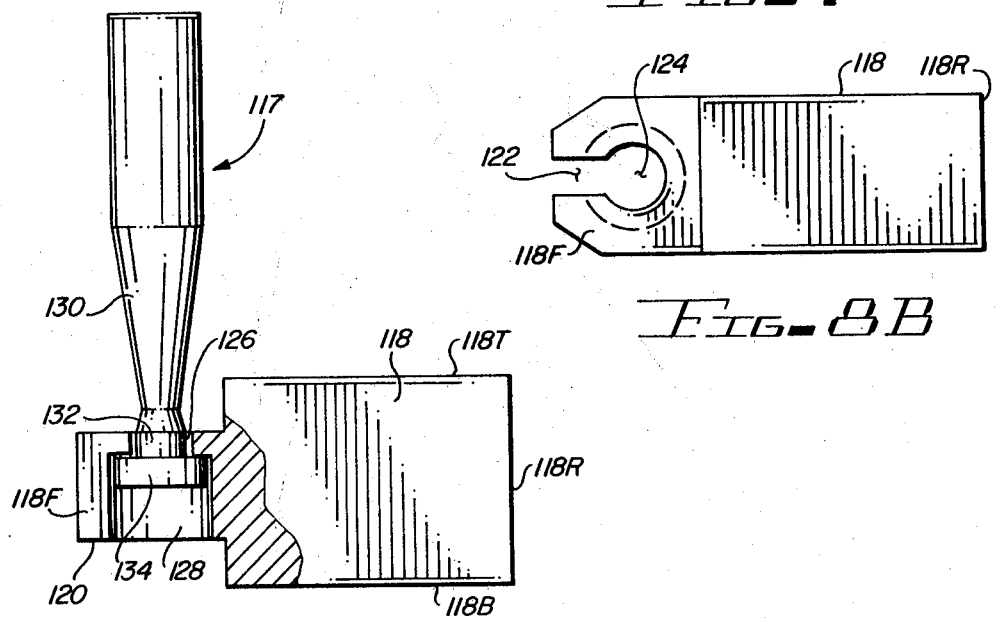
Fig-8A
Fig-8B

LEADER BLOCK FOR SINGLE REEL TAPE CARTRIDGE

CROSS REFERENCE TO RELATED APPLICATIONS

This application is copending with patent application Ser. No. 164,732 filed June 30, 1980, now U.S. Pat. No. 4,335,858. Several other copending applications are related: Ser. No. 164,733 filed June 30, 1980 now U.S. Pat. No. 4,334,656; Ser. No. 249,266 filed Mar. 30, 1981, now U.S. Pat. No. 4,383,660; Ser. Nos. 315,112 and 315,120 filed Oct. 26, 1981.

FIELD OF THE INVENTION

This invention relates in general to single reel cartridges for magnetic tape and, in particular, to a cartridge configuration in which a leader block attached to the free end of the web material provides a positive connection to an automatic threading system.

BACKGROUND OF THE INVENTION

It is desirous in a single reel tape cartridge to provide a means for interconnecting the tape web into the tape driving system in a manner that does not require operator intervention together with a positive and easily connected interconnection. An automatic threading apparatus generally includes a coupling device and a mechanism for moving the coupling device over a predetermined non-linear path extending from the supply reel within the cartridge to a take-up reel in the tape transport device. The function of the coupling device is to selectively engage the leader block, which is firmly attached to the end of the tape wound on the supply reel, in the generally rectangular tape cartridge.

The leader block interacts with the take-up reel such that the tape sees a smooth surface for storage on the take-up reel. The coupling device is generally designed so as to remain coupled to the leader block during the winding and unwinding operation and also to remain attached to the mechanism that has transported the leader block and the coupling device from the position adjacent to the cartridge to the position associated with the take-up reel.

As described in the copending applications, the coupling device includes a pin disposed with its axis parallel to the axis of rotation of the supply and take-up reels. The leader block must interact with the coupling device in a manner which permits the coupling device to be disposed coaxially with the axis of the take-up reel and in a manner such that the leader block is free to rotate about the pin during the winding and unwinding process.

DESCRIPTION OF THE PRIOR ART

The prior art is exemplified by the leader block and cartridge design shown in U.S. Pat. Nos. 3,092,346 and 3,245,629. The leader block or coupling member 25 of the '346 patent includes spring fingers 27 and 28 which are formed to grasp a pull member to pull the tape from the cartridge. The coupling member 25 uses a spring force to hold it to its pull member.

It is, therefore, an object of the present invention to provide a tape cartridge having a coupling member that positively attaches to a pulling member without the use of a spring action in the coupling member.

In the '629 patent, the leader block or coupler 31 includes a bifurcated configuration at 32 that matches with a mating coupler 33 because of the press-fit arrangement between the couplers. The male coupler 33 is pressed into the female coupler 31 to permit the tape to be removed from the cartridge.

Another object of the present invention is to provide a leader block means for removing tape from a cartridge that does not depend upon a press-fit coupling design.

SUMMARY OF THE INVENTION

In accordance with the present invention, a tape cartridge includes a leader block having a slot at/or approximate to its front face or leading surface extending normal to the top and bottom surfaces of the leader block and the cartridge. The leader block is attached to the end of a tape by a pin inserted into a cutout approximate to the rear surface of the leader block. The tape is wound in layers onto the single reel in the cartridge. The slot in the front face of the leader block provides a means for engaging an automatic threading apparatus. The slot extends to an enlarged receiving cavity. The cavity extends a distance less than the height of the leading surface from the bottom of the leader block. The leader block serves as a door to keep the tape media clean and to prevent unwanted access to the tape media. The leader block snaps into a cutoff corner of the cartridge until removed by the automatic threading system.

For the preferred embodiment, the leader block includes a slot slightly offset to its leading surface. The slot has a length extending across the full height of the leading surface of the leader block and running parallel to the axis of rotation of the reel. The depth of the slot is perpendicular to the leading edge of the cartridge when the leader block is held in the cartridge. The depth of the slot is less than the width of the leader block and ends in an enlarged receiving cavity at the bottom of the leader block. A shoulder tapers from the cavity to the slot. The shoulder can be of a partial frustro-conical shape with a circular cavity and a rounded rear portion of the slot.

It is, therefore, an object of the present invention to provide an improved single reel tape cartridge.

Another object of the present invention is to provide a tape cartridge that includes a positive action coupling means for attachment to a tape drive having an automatic threading system.

A further object of the present invention is to provide a magnetic tape cartridge having a leader block connected to the free end of the tape media in which the leader block is adapted for automatic interconnection to a tape threading system in a tape drive.

These and other objects of the present invention will become apparent to those skilled in the art as the description proceeds.

BRIEF DESCRIPTION OF THE DRAWING

The various novel features of this invention, along with the foregoing and other objects, as well as the invention itself, both as to its organization and method of operation, may be fully understood from the following description of illustrated embodiments when read in conjunction with the accompanying drawing, wherein:

FIGS. 3A through 3C are schematic views illustrating a movement of the preferred leader block design between a home position where the leader block prevents access to the tape media to a position where the leader block is shown extracting the tape media from the cartridge;

FIGS. 4A and 4B are perspective views illustrating the relative movements involved in interconnecting a coupling device to the leader block and tape cartridge according to FIG. 1;

FIG. 5 is a perspective view showing the details of the coupling device as attached to one example of an automatic threading device and the connection of the coupling device to the leader block and tape cartridge according to FIG. 1;

FIG. 6 is a perspective view showing the coupling of a leader block to another method of threading another leader block embodiment through a tape drive;

FIG. 7 is yet another method of interconnecting a coupling device to yet another leader block embodiment; and FIGS. 8A and 8B show a partial sectioned and a plan view of another embodiment of a coupling device and a leader block.

DESCRIPTION OF THE PREFERRED EMBODIMENTS

Figure 1:
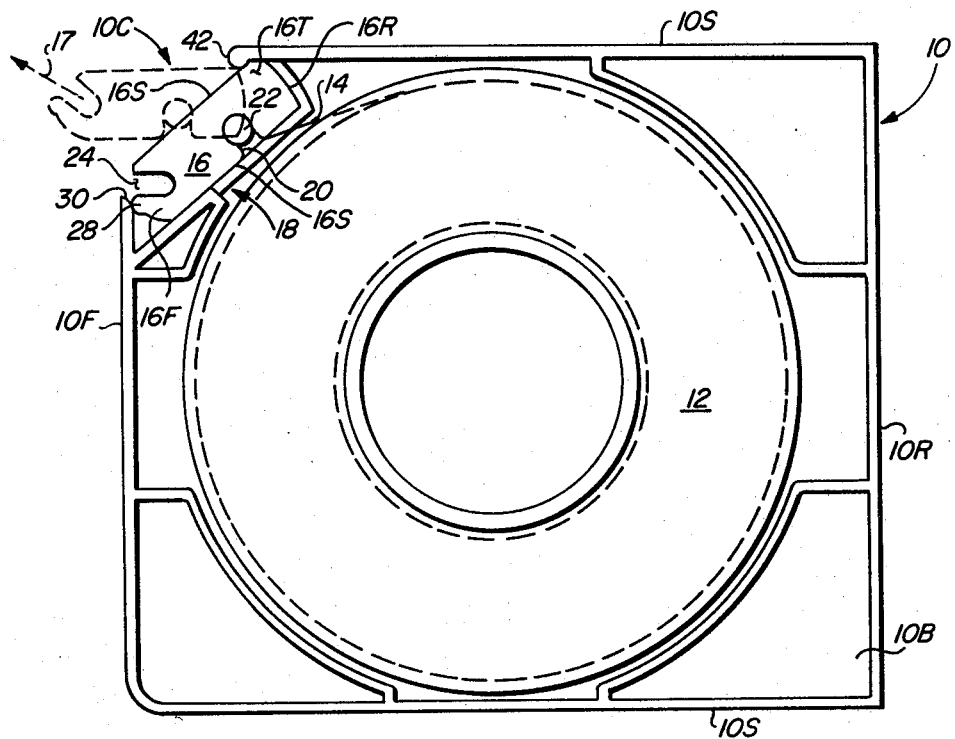
FIG. 1 is a plan view of the top of a single reel magnetic tape cartridge embodying the present invention.

FIG. 1 shows the preferred embodiment for a cartridge box 10 which includes a reel hub 12 containing a plurality of layers of a magnetic tape 14 with a leader block 16 attached to the free end of the tape 14 as it extends from the reel hub 12. The cartridge box, cartridge 10, is generally rectangular in shape except for one corner 10C which holds the leader block 16. The cartridge 10 is basically a box-like structure including elongated pieces: a frontal or leading edge piece 10F, a rear edge piece 10R, two side pieces 10S, a flat bottom section 10B, and a flat top section 10T. The corner 10C is angled at approximately 45° relative to the adjacent sides to provide a shorter fifth side in which a leader block window 18 is included. This leader block window 18 permits the exiting of the tape 14 from the cartridge 10 when the leader block 16 is removed from the corner 10C for threading through a tape drive when the leader block 16 is moved in the direction of the arrow 17. The opening 18 is covered by the leader block 16 when the leader block is snapped into the well formed at the corner 10C of the cartridge 10.

The leader block 16 can be viewed generally as a rectangular block having a leading or frontal surface 16F, a rear surface 16R, side surfaces 16S, a top surface 16T, and a bottom surface 16B opposite the top surface 16T. A cutout 20 extends normal to the top and bottom surfaces of the leader block 16 and the cartridge 10. The cutout 20 together with a pin 22 form a fastening means for holding the tape 14 to the leader block 16. The tape 14 is attached to the leader block 16 such that the side surfaces 16S of the leader block are generally parallel to the plane of the tape surface and the axis of the tape reel 12. The front surface 16F of the leader block 16 includes the means according to the present invention for engaging an automatic threading apparatus. The means, according to the preferred embodiment of this invention, include a slot 24 offset from the front surface 16F of the leader block 16 and generally extending from the top surface 16T to the bottom surface 16B of the leader block. The front surface 16F of the leader block is generally cylindrical and is provided with a rounded boss 28 which engages with an inclined surface 30 of the corner 10C of the cartridge 10.

Figure 2:
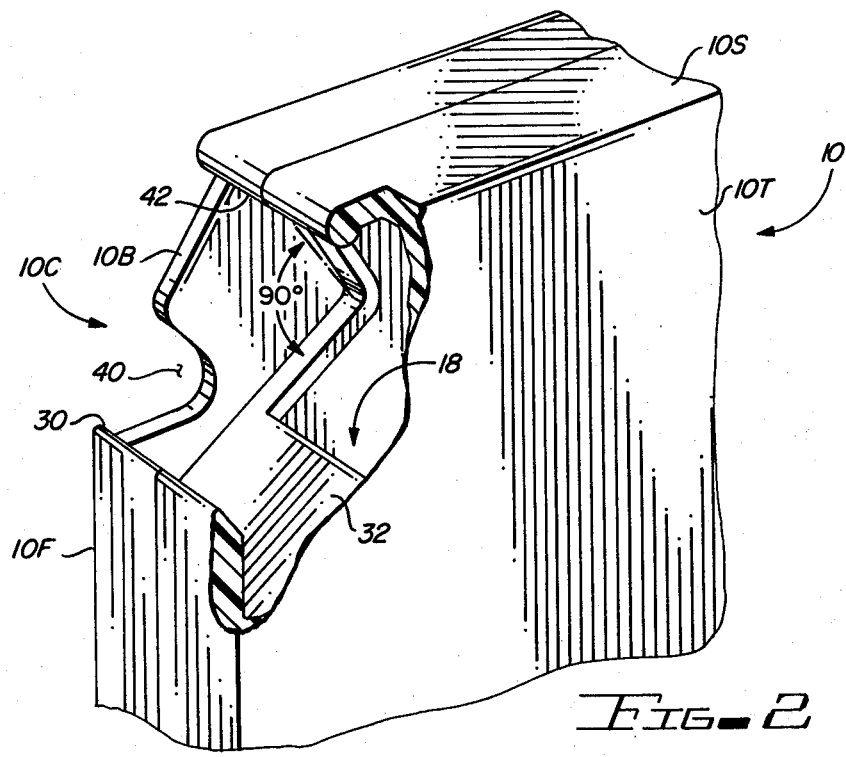
FIG. 2 is a perspective view of a tape cartridge as shown in FIG. 1 with a portion of the cartridge broken away to show the opening into the cartridge without the leader block.

The surface which defines the window 18 for permitting the exiting of the tape 14 from the cartridge reel 12 can be seen in FIG. 2. FIG. 2 illustrates in perspective the corner 10C of the cartridge in which the leader block 16 is disposed. The window 18 is disposed in a surface 32 of the leader block 12 which extends at an angle of approximately 45° between the front 10F and one side 10S of the cartridge 10. The surface 32 together with the top 10T, the bottom 10B, and the sides 10S act as a leader block well. A portion of the bottom 10B of the cartridge 10 is cut out at 40 to accommodate a coupling device (not shown) for the leader block 16. The interface of the leader block and the cartridge are shown in more detail in FIG. 3.

FIGS. 3A through 3C illustrate the movement of the leader block 16 from a home position, FIG. 3A, to a position where the leader block is pulling tape through the opening 18, FIG. 3C. FIG. 3A illustrates the leader block 16 snugly positioned into the corner 10C of the cartridge 10 with the rounded boss 28 engaging the surface 30 of the frontal piece 10F. This interface, together with a boss 42 in the side 10S of the cartridge, holds the leader block 16 firmly within the corner 10C of the cartridge. This is the home position of the leader block 16. FIG. 3B illustrates the position of the leader block 16 in which the leader block has been pivoted about the rounded surface 42 of the leader block well as a result of a pulling force acting in the direction of the arrow 17. The force may originate as previously mentioned from an automatic threading apparatus of the type as will be described later. It should be, of course, understood that any suitable means may be used to extract the leader block from the cartridge 10 for threading through a tape drive unit.

FIG. 3C shows the position of the leader block 16 away from the cartridge 10 and moving in a direction which unwinds the tape 14 from the reel 12. During the operation of the tape drive, the tape 14 is unwound from the reel 12 and wound onto a machine reel (not shown). During a rewinding operation, the leader block 16 follows the reverse path from FIG. 3C to FIG. 3A as the reel 12 is rereeling the tape 14 and pulling the leader block 16 back into the cartridge 10. The cartridge 10 may then be removed from the tape drive and a new cartridge inserted for subsequent operations. The interconnection of the coupling device from the automatic threading system into the leader block 16 is shown in FIGS. 4A, 4B and 5.

In FIG. 4A, the leader block 16 is shown connected to the magnetic tape 14 by the pin 22 which could be made of a soft plastic material, for instance. In FIG. 4B, the cartridge 10 is shown positioned while being inserted into a carriage loading station such that the leader block 16 is interconnected with a coupling device shown as a threading pin 46. The threading pin 46 is shown connected to a follower linkage 48 which can be connected to some threading mechanism such as that shown in FIG. 5 as will be described later. In the preferred embodiment of the present invention, the slot 24 is offset from the leading surface 16F and angled to the side surfaces 16S. The length of the slot 24 extends from the top surface 16T to the bottom surface 16T. When the leader block 16 is held within the leader block receiving well as shown in FIG. 4A, the length of the slot 24 is parallel to the axis of rotation of the reel 12. The depth of the slot 24 is angled to the side surface 16S such that with the leader block 16 in the leader block receiving well, the slot depth is perpendicular to the leading edge 10F of the cartridge 10. The depth of the slot 24 extends a distance into the leader block 16 less than the width of the leader block, i.e., the slot 24 stops short of the side 16S.

The slot 24 leads to an enlarged receiving cavity 52 at a rear 50 of the slot 24. A tapered section 54 gradually decreases the diameter of the cavity 52 to the rounded section 50 at the rear of the slot 24. The pin 46 of the follower linkage passes through the slot 24 to the cutout section 50. The pin 46 includes a larger cylinder section 56 with a tapered shoulder 58 for mating with the cavity 52 and the tapered section 54 of the leader block 16.

The cartridge 10 and the leader block 16 are placed within a carriage wherein the cartridge 10 and the leader block 16 have been moved forward in the direction such that the pin 46 is captured within the cutout 50. Then as is shown in FIG. 4B, relative motion is provided between the leader block 16 and the pin 46 and the follower linkage 48. Generally the cartridge 10 is moved downward in the direction of arrow 60. The motion places the tapered shoulder 58 and larger diameter section 56 of the pin 46 into the tapered section 54 and the large diameter cutout 52 of the leader block 16. By this relative motion, the leader block is positively captured by the coupling device, pin 46, for pulling through a complex tape threading path by a threading means such as shown in FIG. 5.

FIG. 5 shows the details of a threading device as is more fully described in copending application Ser. No. 164,732 filed on June 30, 1980 and assigned to the assignee of the present invention. In this copending application, an automatic threading apparatus is disclosed which comprises basically a coupling device and a mechanism for moving the coupling device and the leader block 16 over a predetermined non-linear tape path extending between the tape reel 12 and a take-up machine reel in the magnetic tape transport. The function of the coupling device, pin 46, is to selectively engage the leader block 16 and to remove the leader block 16 and the tape 14 from within the cartridge 10. Only the operation of the threading system is shown in FIG. 5; it is assumed that the follower linkage 48 is firmly connected to the leader block 16 as described previously in FIG. 4B.

Referring to FIG. 5, a channel 60 includes a sprocketed guide tape 62 captured within upper and lower slots 64 and 66 of the channel 60. The surfaces of the slots 64 and 66 may be coated with a suitable material to reduce any frictional drag on the guide tape 62. The slotted portions of the channel 60 are held in alignment by an integral back portion 67 shaped to provide the necessary rigidity to the channel and to allow space for the means for connecting the follower linkage 48 to the guide tape 62. The guide tape 62 is flexible enough along its lengthwise direction to readily conform to the various curves in the channel 60. As shown, the guide tape 62 is provided with a series of sprocket holes 68 which cooperate with a sprocket gear (not shown) that is rotated to drive the guide tape 62 relative to the channel 60. Moving the guide tape 62 through the complex turns in the channel 60 causes the follower linkage 48 to follow along this path thereby pulling the leader block 16 and the tape 14 along this same path.

Yet another threading system for use with the present invention is shown in the patent application entitled "Pantocam Web Threading Apparatus", Ser. No. 315,112, filed on Oct. 26, 1981 and assigned to the assignee of the present invention. In this application, a broken arm linkage is used to pull the leader block 16 and the tape 14 through a complex tape path. The broken arm linkage is controlled by a follower link that follows a cam groove. Rotating the broken arm linkage causes the tape to follow the tape path in a sweeping motion past guides and a transducer into a take-up machine reel. For the purposes of the present invention, however, the interconnection of the coupling device to the leader block 16 is essentially similar as that shown in FIGS. 4A and 4B.

In FIG. 6, another threading apparatus is shown in a close-up of the interconnection between a coupling device 70 and a leader block 72. A more complete description of the threading device is described in a copending application entitled "A Constant Force Windup Spring Web Threading System", Ser. No. 315,120, filed on Oct. 26, 1981 and assigned to the assignee of the present invention. A close-up of the interconnection between the leader block 72 and a pin 74 for the threading operation is shown in FIG. 6.

The leader block 72 includes a slot 76 in a front face 72F of the leader block 72. A rounded back section 80 is formed at the rear of the slot 76. An enlarged receiving cavity 78 is fashioned in a bottom surface 72B of the leader block 72 at the rounded back section 80. A tapered cutout section 82 is formed between the cavity 78 and the slot 76. Besides the pin 74, the coupling device 70 includes a section 84 having a larger diameter than that of pin 74 and a tapered shoulder 86 between the larger diameter 84 and the smaller diameter of pin 74. The coupling device 70 is mounted to a spool 88 which contains a supply of a negator spring 90.

In the operation of this interconnection between the leader block 72 and the coupling device 70, the slot 76 in the leader block 72 passes over the pin 74 of the coupling device 70 as the cartridge is inserted into the tape drive until the pin 74 contacts the rounded back section 80 of the slot 76. The cartridge is then urged downward causing the leader block 72 to move downward until the tapered shoulder section 86 and the larger diameter 84 of pin 74 are inserted into the cutout section 78 and the tapered section 82 of the leader block 72. The leader block 72 thus becomes seated onto the coupling device 70 in a positive manner such that, when the negator spring 90 winds around the reel 88, the leader block 72 and a tape 73 are pulled along the threading path as described in the aforementioned patent application, Ser. No. 315,120. FIG. 7 discloses a leader block and coupling device interconnection to an automatic tape threading apparatus as described in a copending application, Ser. No. 164,733, filed on June 30, 1980 and assigned to the assignee of the present invention. FIG. 7 shows a leader block 92 having a length of tape 94 connected into a rear surface 92R of the leader block. The leader block 92 is shown poised for connection to a coupling device 96. The coupling device 96 includes a pin section 98 with a tapered shoulder 100 leading to a section 102 having a larger diameter than the pin 98. The leader block 92 has a slot 104 which leads to a hole 106 having a diameter either the same as or slightly larger than the width of the slot 104. The cutout section 106 includes a tapered section 108 leading to an enlarged receiving cavity 110 in a bottom surface 92B of the leader block 92.

The coupling device 96 is permanently attached to the exterior surface of a band member 111 to position the pin 98 with its axis parallel to the slot 104 in the leader block 92. The coupling device 96 is mounted for sliding movement between the position where it is connected to the leader block 92 and to a position in the tape drive adjacent to a take-up reel where the tape 94 is wound. The pin 98 is mounted for axial movement by an actuator mechanism 112 including a solenoid 115 and an anvil 116. A coil spring 114 urges the pin 98 upward. In FIG. 7, the pin 98 is in a position for entering into the slot 104 of the leader block 92. The pin 98 is held in its downward position by the anvil 116. The second position of the pin 98 is in its upward motion where the tapered shoulder 100 and the larger diameter section 102 of the pin 98 enters into the tapered section 108 and the cavity 110 of the leader block 92. The coupling of the pin 98 to the leader block 92 is by the relative motion of the two parts but in this embodiment it is by the axial motion of the pin 98. Various arrangements known in the art may be employed to achieve the function of obtaining the axial movement of the pin 98 relative to the leader block 92. The mechanism 112 involves the spring member 114 biasing the pin 98 upward and the solenoid 115 operating the anvil 116 which overcomes the normal biasing of the spring 114 when the leader block 92 is to be decoupled from the coupling device 96.

Yet another embodiment of a leader bock 118 is shown in FIGS. 8A and 8B attached to a tapered coupling device 117. The leader block 118 includes a shorter leading section 118F which includes a keyed slot 122 leading to a cylindrical cutout section 124. The cylindrical cutout section 124 includes two cavities 126 and 128 of a narrower and wider diameter, respectively. The coupling device 117 includes a frustum section 130 leading to a cylindrical portion 132 of a narrow diameter and a cylindrical portion 134 of a larger diameter. In the process of connecting the leader block 118 to the coupling device 117, the frustum section 130 is passed between the keyed slot 122 of the leader block 118. Relative motion is then provided by either raising the coupling device 117 or lowering the cartridge containing the leader block 118. The leader block 118 includes a shorter leading surface 118F, a rear surface 118R and a stepped top surface 118T and bottom surface 118B. This relative motion causes the larger diameter cylindrical portion 134 of the coupling device 117 to enter into the larger diameter cavity 128 of the leader block 118. This provides a positive interconnection between the leader block and the coupling device since the larger diameter cylindrical portion 134 cannot pass through the keyed slot 122. Thus when the coupling device travels along its threading path, the leader block 118 will remove the tape from the cartridge. For the removal of the coupling device 117 from the leader block 118 after the tape has been replaced into the cartridge, the reverse relative motion occurs to either lower the coupling device 117 or raise the leader block 118 to permit the frustum portion 130 and the narrow diameter cylindrical portion 132 to pass between the keyed slot 122 when the cartridge and the leader block are removed from a position adjacent to the coupling device 117.

The principles of the present invention have now been made clear in an illustrative embodiment. There will be immediately obvious to those skilled in the art many modifications of the structure, arrangement, proportions, the elements, materials and components used in the practice of the invention. For instance, there are many different shapes of cartridges and many different types of webbing material other than magnetic tape that can be substituted without departing from the present invention. It should also be evident that different shapes, that is, other than rectangular, can be used for the leader block requiring only the constraints of the present invention. Likewise, once taught the practice of this invention, other modifications can be made to the coupling device. Further, the preferred mechanism shown for the threading mechanism is illustrative of embodiments which may be used in the practice of this invention and other threading devices could be determined by those skilled in the art again without departing from the present invention. The appended claims are, therefore, intended to cover and embrace any such modification within the limits only of the true spirit and scope of the invention.

What is claimed is:

1. A magnetic tape cartridge, comprising:
an approximately square box having two elongated side pieces, approximately square top and bottom sections, and elongated leading and rear edge pieces, all of said pieces interconnecting said top and bottom sections respectively on four sides of the box for creating a tape receiving cavity in the box, the box having a tape-access opening to said tape-receiving cavity at one corner portion of said leading edge and one of said side pieces, said bottom section having a reel drive means opening for receiving a reel drive element, an apertured well-forming wall obliquely extending across said tape-receiving cavity at said one corner portion to form a leader block-receiving outwardly-opening well;
a tape-receiving reel disposed at the approximate center of the top and bottom sections and being coaxially disposed with respect to said drive means opening such as to be accessible for rotation coaxially of said drive means opening about a given axis of rotation;
a web of magnetic tape wound on said reel and having a free end disposed adjacent said one corner portion; and
an elongated leader block being shaped to fit into said well and being attached to the free end of said tape along one longitudinal side of said leader block that faces the reel when said leader block is in said outwardly opening well such that a pivoting of the leader block during insertion and extraction thereof into and out of the well is facilitated, said leader block further including an outwardly-opening slot extending inwardly from an outwardly-facing longitudinal side of said leader block and extending entirely across said leader block in a direction parallel to said axis of rotation of said reel, and said slot leader block having an enlarged cavity opening toward said bottom section and to said slot whereby a leader block pickup pin having an enlarged boss can be inserted into said slot and said enlarged cavity for positive locking engagement.

2. A magnetic tape cartridge as described in claim 1 further including a partial frustro-conical shaped shoulder in said leader block extending between said enlarged cavity and said slot.

3. A magnetic tape cartridge as described in claim 1 wherein said slot is rounded at its rear portion adjacent to said cavity.

4. A magnetic tape cartridge as defined in claim 1 wherein said leader block includes a boss adjacent said slot for interfacing with the leading edge piece of said box to hold said leader block within the leader block receiving well.

5. A magnetic tape cartridge as defined in claim 1 wherein said leader block is of a size to effectively seal the tape access opening and well-forming wall aperture in the box and for capture in the leader block receiving well.

6. A magnetic tape cartridge as defined in claim 1 wherein said leader block is adapted to be engaged by a coupling device of an automatic threading system, said coupling device comprising said pin having a diameter for entering said slot and a cylindrical section of a diameter larger than the diameter of said pin and said slot for entering said enlarged cavity.

7. A magnetic tape cartridge comprising:
- an approximate square box having two elongated side pieces, approximate square and planar top and bottom sections, and elongated leading edge and back edge pieces, all of said pieces interconnecting said top and bottom sections such as to leave a tape access opening to the interior of the box at one corner of the leading edge piece and one side piece, said bottom section having a centrally located drive means opening, an apertured leader block receiving well disposed across said tape access opening;
- a reel rotatably positioned at the approximate center of the box to be accessed for rotation at said drive means opening about an axis of rotation;
- a web of magnetic tape wound on said reel and having a free end;
- a leader block having leading and rear surfaces and being attached to the free end of said web one side of said leader block approximate to its rear surface, said leader block being of a size for capture in the tape access opening by the leader block receiving well;
- said leader block including an outwardly-opening elongated slot and an enlarged pin boss receiving cavity aligned with the slot with the cavity opening toward said bottom section;
- said slot having a length and a depth with the length extending across the full height of and approximate to the leading surface of said leader block, the length being parallel to the axis of rotation of said reel and the depth being perpendicular to the leading edge of the box when said leader block is held within the leader block receiving well, the depth being less in size than the width of said leader block; and
- a shoulder in said leader block extending between said cavity to said slot.

8. A magnetic tape cartridge as defined in claim 7 wherein said shoulder has a partial frustro-conical shape and extending between said cavity to said slot.

9. A magnetic tape cartridge as defined in claim 7 wherein said slot is rounded at its rear portion adjacent to said enlarged cavity.

10. A magnetic tape cartridge as defined in claim 7 wherein said leader block includes a boss at its leading surface for interfacing with the leading edge piece of said box to yieldably hold said leader block within the leader block receiving well.

11. A magnetic tape cartridge as defined in claim 7 wherein said leader block is of a size to effectively seal the tape access opening in the box and for capture in the leader block receiving well.

12. A magnetic tape cartridge as defined in claim 7 wherein said leader block is adapted to be engaged by a coupling device of an automatic threading system, said coupling device comprising a pin having a diameter for entering said slot and a cylindrical section of a diameter larger than the diameter of said pin and said slot for entering said cavity.

13. A magnetic tape cartridge comprising:
- an approximate square box having two elongated side pieces, approximate square and planar top and bottom sections and elongated leading edge and rear edge pieces, all of said pieces interconnecting said top and bottom sections for enclosing a tape receiving cavity with a tape access opening to the tape-receiving cavity of the cartridge at one corner of the leading edge and one side piece, said bottom section having a centrally-located drive means opening, and a leader block receiving well disposed across said tape access opening;
- a reel rotatably positioned at the approximate center of the box to be accessed for rotation at said drive means opening;
- a web of magnetic tape wound on said reel and having a free end;
- a leader block having the free end of said web attached on one side of said leader block approximate to its rear surface, said leader block being of a size for capture in the tape access opening in the box in the leader block receiving well;
- said leader block having a slot with a length and a depth with the length extending across the full height of and approximate to the leading surface of said leader block, the length being parallel to the axis of rotation of said reel and the depth being perpendicular to the leading edge of the box when said leader block is held within the leader block receiving well, the depth being less in size than the width of said leader block;
- said leader block having a cavity at the rear of said slot extending a distance less than the height of the leading surface of said leader block from the bottom, said cavity having a cross-dimension larger than the width of said slot; and
- a shoulder in said leader block extending from the width of said cavity to the width of said slot.

14. A magnetic tape cartridge as described in claim 13 wherein said slot is rounded to be concave at its rear portion adjacent to said cavity.

15. A magnetic tape cartridge as defined in claim 13 wherein said leader block is adapted to be engaged by a coupling device of an automatic threading system, said coupling device comprising a pin having a diameter for entering said slot and a cylindrical section of a diameter larger than the widths of said pin and said slots for entering said cavity.

16. In a magnetic tape cartridge in which a length of magnetic tape is wound on a single reel with the free end of the tape permanently connected to a leader block, said cartridge completely surrounding said reel of magnetic tape except for an opening provided at one corner of said cartridge which permits tape wound on said reel to be unwound as said leader block is moved away from said cartridge, a corner portion of said cartridge through which said tape passes having a leader block receiving well including a bottom surface which defines the opening in said cartridge through which said tape moves and including other opposed surfaces attached to said bottom surface for engaging leading and trailing surfaces of said leader block, said leader block overlaying said opening when said cartridge is not in use, the improvement wherein said leader block includes a slot extending from top to bottom of said leader block approximate to its leading surface, with said slot preceding to an opening also extending from top to bottom of said leader block with said opening having two magnitudes, at least one of which is larger than the width of said slot.

17. In a magnetic tape cartridge as defined in claim 16 further including the improvement wherein said slot is offset at a predetermined acute angle to one side surface of said leader block and is perpendicular to a leading edge of the cartridge when said leader block is held within the leader block receiving well.

18. In a magnetic tape cartridge as defined in claim 16 further including a coupling device of an automatic threading system wherein the improvements further include the coupling device comprising a pin having a diameter for entering said slot and a cylindrical section of a diameter larger than the widths of said pin and said slots for entering said cavity.

19. A record-tape-containing cartridge, including in combination:
   a relatively-flat rectangular substantially-closed housing having a rectangular base wall lying in a first rectangular plane and with an aperture for receiving a tape driving element; said plane having first through fourth corners, three of said corners being coincident with corners of said rectangular base wall; a top wall facing and being spaced from said rectangular base wall, four side walls extending between said base and top walls for enclosing a tape containing cavity of said housing;
   a first of said side walls of said housing closing one side of said housing and having a first extremity spaced from said first corner of said plane;
   a second side wall of said housing closing a second side of said housing and being disposed at a right angle with respect to said first side wall and having an extremity spaced from said first corner of said plane such that an opening into the tape cavity of said housing lies between said first and second side wall extremities;
   said extremity of said first sidewall having an enlarged end portion;
   a tape-holding reel disposed inside and housing and having an axis of rotation coaxial to said aperture in said rectangular base wall and a tape disposed on said reel with a free end located adjacent said first corner;
   a well-forming wall inside said housing and extending between said first and second side walls and having two ends attached to said sidewalls closely adjacent to said extremities, respectively, and having a first portion disposed tangentially to said tape-holding reel and a second portion extending at a right angle to said first portion of said first side wall for forming an outwardly opening well, said first portion having a tape aperture for permitting said tape to leave and reenter said housing, said well-forming wall being disposed between said first corner and said tape reel; and
   a rectangular leader block affixed to said free end of said tape and adapted at a rear face thereof to fit against said well-forming wall second portion with said tape being affixed to one longitudinal wall of said leader block that faces said first portion when the leader block is fitted against said second portion, said rectangular leader block having a pin receiving outwardly-facing slot disposed in the leader block and having a longitudinal extent parallel to the width of said tape and so as to be adjacent the extremity of said second sidewall when the leader block is against said well-forming wall whereby said pivot block is subjected to moments of force about said second portion of said well-forming wall during insertion into and extraction from said well formed by said well-forming wall of the cartridge.

20. The record-tape-containing cartridge set forth in claim 19 wherein said leader block consists of compressible material such that when the leader block is fully received in said well a compression force compressing the leader block is exerted by said extremities.

21. The record-tape-containing cartridge set forth in claim 19 wherein said leader block rear face has a convex surface and said well-forming wall second portion has a concave surface facing said convex surface for mating therewith.

22. The record-tape-containing cartridge set forth in claim 19 wherein said leader block has a width substantially similar to the width of said tape and said slot extends the width of said leader block and from a corner of said leader block that is exposed when the leader block is fully received in said well.

23. The record-tape-containing cartridge set forth in claim 22 wherein said leader block has a convex surface having a width equal to the width of said tape and extending from said slot to its surface that contacts said first portion of said well-forming wall and further having a boss the width of the tape across immediately adjacent said slot.

24. The record-tape-containing cartridge set forth in claim 19 wherein the tape on the reel comes off the reel somewhat parallel to said first sidewall and said second portion of said well-forming wall including said tape aperture such that the tape aperture extends from immediately adjacent said first sidewall to over one-half the spacing between said first and second sidewalls as measured on said first portion whereby said tape as it comes off said reel can move toward or away from said first sidewall.

25. A leader block adapted to close a tape-containing cartridge and be affixed to a free end of such tape, comprising:
   an elongated rectangular block of plastic material having a width substantially the width of the tape and having oppositely facing front and rear surfaces, oppositely facing top and bottom surfaces and oppositely facing first and second side surfaces, said top, bottom and side surfaces between elongated and joined along their respective longitudinal edges with said front and rear surfaces closing the block at respective opposite longitudinal ends thereof;
   said second side surface including an outwardly-opening lock-pin-receiving slot extending the width of said block and being disposed a predetermined distance from said rear surface,
   said front and first side surfaces sharing an outward-facing extraction-pin-receiving slot extending the width of said block and being disposed at predetermined acute angle with respect to said first side surface; and said second side surface having a convex end portion extending from a second and greater predetermined distance from said rear surface than said lock-pin-receiving slot with said convex end portion terminating adjacent said extraction-pin-receiving slot.

26. The leader block set forth in claim 25 further including an enlarged extremity portion at an outer end of said convex surface which extends the width of said block along the outward facing opening of said extraction-pin-receiving slot.

27. The leader block set forth in claim 26 wherein said leader block consists of resilient material for allowing compression thereof.

28. The leader block set forth in claim 27 wherein said rear surface has a convex shape as viewed from either said top or bottom surfaces.

29. The leader block set forth in claim 28 wherein said lock-pin-receiving slot is disposed about one-third the distance from said rear surface to said enlarged extremity outer end portion.

30. The leader block set forth in claim 25 wherein said block consists of compressible material and the portion of said block between said extraction-pin-receiving slot and said second side convex surface is a yieldable finger for locking said leader block into a leader block receiving well of data cartridge.

31. The leader block set forth in claim 25 wherein said extraction-pin-receiving slot includes an enlarged cavity opening towards said bottom surface.

32. The leader block set forth in claim 31 further includes a partial frustro-conical shaped shoulder in said leader block extending between said enlarged cavity and said slot.

33. The leader block set forth in claim 32 wherein said shoulder is positioned approximately midpoint between said top and bottom surfaces.

34. A magnetic tape cartridge as defined in claim 7 wherein said shoulder is positioned approximately midpoint of the height of said leader block.

35. A magnetic tape cartridge as defined in claim 13 wherein said shoulder is positioned approximately midpoint of the height of said leader block.

36. In a magnetic tape cartridge as defined by claim 16 wherein the two magnitudes of said opening converge at the approximate midpoint between the top and bottom of said leader block.

37. A magnetic tape cartridge as defined in claim 1 wherein said enlarged cavity opening of said leader block slot has its start towards said bottom section of said leader block approximately midpoint of the leader block dimension extending from the top to the bottom section of said box.

* * * * *

UNITED STATES PATENT AND TRADEMARK OFFICE
CERTIFICATE OF CORRECTION

PATENT NO. : 4,452,406
DATED : June 5, 1984
INVENTOR(S) : M. E. RICHARD

It is certified that error appears in the above—identified patent and that said Letters Patent is hereby corrected as shown below:

Claim 3, Line 1     Change "1" to --19--

Claim 19, Line 47   Change "and" first occurrence to --said--

Signed and Sealed this

Ninth Day of October 1984

[SEAL]

Attest:

GERALD J. MOSSINGHOFF

Attesting Officer      Commissioner of Patents and Trademarks